United States Patent [19]

Wege

[11] Patent Number: 4,595,038

[45] Date of Patent: Jun. 17, 1986

[54] PRESSURE ACCUMULATOR AND VESSEL THEREOF

[75] Inventor: Manfred Wege, Gladenbach, Fed. Rep. of Germany

[73] Assignee: Bolenz & Schäfer Maschinenfabrik Zweigniederlassung der Rexnard GmbH, Bledenkopf-Eckelshausen, Fed. Rep. of Germany

[21] Appl. No.: 654,054

[22] Filed: Sep. 24, 1984

Related U.S. Application Data

[63] Continuation of Ser. No. 462,931, Jan. 31, 1983, abandoned.

[30] Foreign Application Priority Data

Feb. 8, 1982 [DE] Fed. Rep. of Germany ....... 3204205
Aug. 26, 1982 [DE] Fed. Rep. of Germany ....... 3231723

[51] Int. Cl.[4] .............................................. F16L 55/04
[52] U.S. Cl. .................................. 138/31; 277/188 A
[58] Field of Search ........................ 138/26, 30, 31, 89, 138/91; 220/327, 328, 378; 277/188 A, DIG. 3, DIG. 6; 292/256.6, 256.71

[56] References Cited

U.S. PATENT DOCUMENTS

| | | | |
|---|---|---|---|
| 955,500 | 4/1910 | Clark | 138/91 |
| 2,658,809 | 11/1953 | Schultz | 277/188 A |
| 3,364,950 | 1/1968 | Zajdler | 138/31 |
| 3,521,893 | 7/1970 | Josephson | 277/188 A |
| 3,686,073 | 8/1972 | Baerfuss | 220/378 X |
| 3,695,482 | 10/1972 | Smith | 220/378 X |
| 4,375,227 | 3/1983 | Wegsheider | 138/31 |
| 4,443,016 | 4/1984 | Schungel | 220/378 X |

FOREIGN PATENT DOCUMENTS

| | | | |
|---|---|---|---|
| 532404 | 10/1956 | Canada | 277/188 A |
| 1175120 | 3/1959 | France | 138/31 |

*Primary Examiner*—James E. Bryant, III
*Attorney, Agent, or Firm*—Michael J. Striker

[57] ABSTRACT

A pressure accumulator for hydraulic systems in control mechanisms of electric high-voltage lines comprises essentially a cylinder which is closable at its end faces by a lid, wherein the lid includes a cover plate inserted in the cylinder and having a shape such as to define an annular recess at its periphery in which a cover member is located thereby defining an annular groove between the cover plate and the cover member. Within this annular groove, a sealing member is disposed having the shape of an annular disk. For preventing penetration of the edges of the sealing ring into gaps formed between the individual lid parts and the cylinder wall, the cover member, the cover ring and the sealing ring are provided with associated recesses and grooves in which respective support rings are disposed.

14 Claims, 1 Drawing Figure

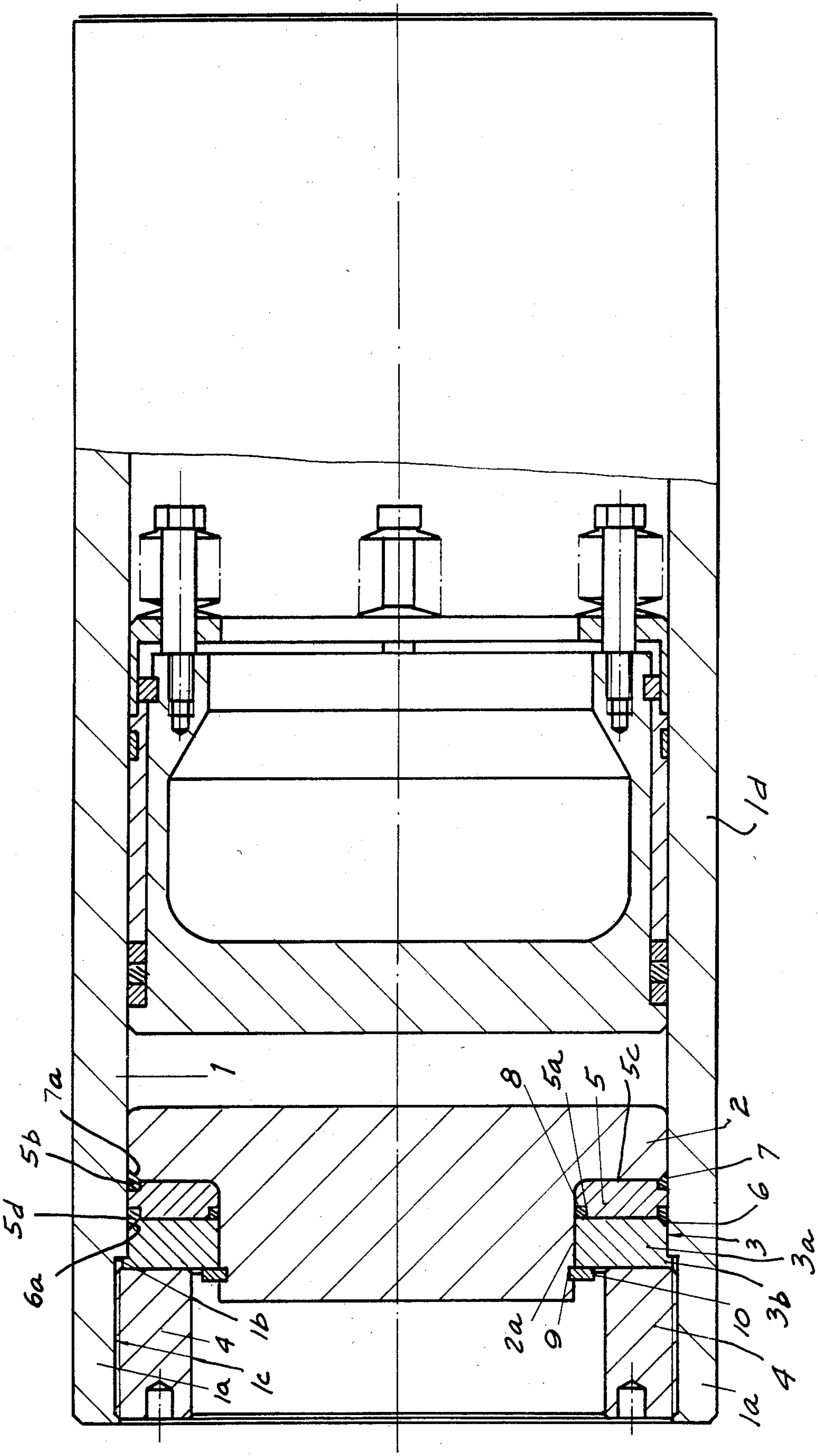
1d
1
7a
5b
5d
6a
8
5a
5
5c
2
7
6
3
3a
2a
9
10
3b
4
1b
1c
1a
4
1a

PRESSURE ACCUMULATOR AND VESSEL THEREOF

This is a continuation of application Ser. No. 462,931, filed Jan. 31, 1983 now abandoned.

BACKGROUND OF THE INVENTION

The present invention relates to a pressure accumulator especially for hydraulic systems in control mechanisms of electric high-voltage lines, and more particularly to a tight closure of such pressure accumulator.

Pressure accumulator of this kind, usually consist of a cylinder whose end faces are each closed.

In a known pressure accumulator the end faces of the cylinder are closed by a lid which is to be inserted in the cylinder. The lid has one peripheral area which abuts the end face of the cylinder and is provided with a flange portion which is in engagement with a groove formed in the cylinder wall. The lid is further provided with a recess at its peripheral area which extends into the cylinder. In this recess, an annular seal is located which is of elastic material. In order to fasten the lid to the cylinder, a threaded ring is screwed with the end section of the cylinder. Within the interior of the cylinder, a plunger is located thereby dividing the interior into two sections which are respectively connected with a line system of a pressure medium and with a pressure cushion of compressed gas. The latter section is connected with a gas pressure generator.

In order to have a permanent and reliable operation of such pressure accumulator, the sealing of the end faces of the cylinder is of great importance. In the known pressure accumulator, the sealing ring is of O-shape and made as previously mentioned of elastic material e.g. synthetic caoutchouc. As will be described herein below, such O-shaped sealing rings do have considerable drawbacks. The sealing must resist fluctuations in temperatures of approximately from 40° C. to +80° C. and pressures up to 375 bar. Although there exist sealing materials which retain their functions within such a temperature range, however, they are not suitable for gaseous medium at pressures up to 375 bar. Under these circumstances, the gas diffuses through the material, especially upon very low temperatures. A further stress factor for the material resides in the fluctuations in pressure which can amount to up to 100 bar upon each switching step in the hydraulic system of the control mechanism. Such fluctuations in pressure may damage the material of the sealing rings in its structure, unless those sealing rings even with mirror deficiencies are separated during the manufacture of such pressure accumulators. Such a procedure is not only very cumbersome but also the production of sealing rings having such a high standard is hardly manageable by the concerned producers. Even, in case some producers are in a position to manufacture such high-quality sealing rings, the amount of rejected sealing rings is too high so that the expenses with respect to the material as well as to the necessary manual inspection are uneconomical.

Further, it is to be noted that upon using a lid composed of a cover plate and a cover member movable with respect to the cover plate, the cross section of the annular groove formed between these structural parts can be diminished against the resistance of the sealing ring. When using a sealing with the known O-shaped cross section, a relatively small contact surface is subjected to the total pressure acting actually on the sealing and this causes some diffuculties. Thus, the sealing ring will considerably be deformed thereby exposing the cylinder walls to a considerable radial pressure which could lead to a bulging out of the cylinder.

SUMMARY OF THE INVENTION

The object of the invention is thus to provide a pressure accumulator which avoids the aforementioned disadvantages.

More particularly, it is an object of the present invention to provide a sealing of the pressure accumulator which does not require the high demands to the material and is capable to receive any pressure without being deformed in an intolerable way.

A concomitant object of the present invention is to provide a pressure accumulator which is simple in construction, reliable in operation and inexpensive to manufacture nevertheless.

In keeping with these objects, and with others which will become apparent hereinafter, one feature of the invention resides, briefly stated, in a pressure accumulator in which a lid is used for sealing off each end face of the cylinder and includes a cover plate which is inserted in the cylinder and has such a shape that an annular recess is defined at its periphery, the lid includes a cover member located in the annular recess and concentrically surrounding a part of the cover plate, thereby defining an annular groove between the cover plate and the cover member, and in this annular groove between the cover plate and the cover member a sealing member is disposed which is formed as a ring-shaped disk.

According to a further feature of the present invention, the cover plate has a first edge at its peripheral area, and the cover member has a second edge at its peripheral area, wherein the first and the second edges face each other and are tapered outwardly for providing a first and second tapered groove so that the annular groove between the cover plate and the cover member widens towards the cylinder wall.

The sealing member which is located in the annular groove is provided with a first recess at its peripheral edge facing the cover plate, with a second recess at its peripheral edge facing the cover member and with a third recess at its edge facing the cover plate and the cover member, wherein the first and second recess have a depth corresponding to the depth of the first and second tapered groove. In the first recess which cooperates with the first groove as well as in the second recess cooperating with the second tapered groove and in the third recess a support ring is provided respectively.

When a pressure accumulator is formed according to the present invention, the pressure caused by the cover plate and the cover member is uniformly distributed on a substantially larger area, since the sealing member is formed as an annular disk having large radial surfaces which contact with the cover member and cover plate. In comparison to the conventional O-shaped ring, a disk so formed has the advantage that the radial deformation of the sealing member is kept within tolerable limits upon increasing pressure within the cylinder. Hence, the danger of a bulging out of the cylinder wall in the sealing area is prevented.

A further advantage of the pressure accumulator according to the invention resides in the fact that the support rings close any gaps between the lid parts and the cylinder walls so that the edges of the sealing ring cannot be forced into these gaps.

The novel features which are considered as characteristic for the invention are set forth in particular in the appended claims. The invention itself, however, both as to its construction and its method of operation, together with additional objects and advantages thereof, will be best understood from the following description of specific embodiments when read in conjunction with the accompanying drawing.

BRIEF DESCRIPTION OF THE DRAWING

The single FIGURE shows an axial section of one end face of a pressure accumulator according to the invention.

DESCRIPTION OF THE PREFERRED EMBODIMENTS

A pressure accumulator as shown in the drawing includes a cylinder 1 which is closeable at its both end faces by a removable lid. The cylinder 1 has a cylinder wall 1*d* whose end section 1*a* in the vicinity of each end face has a wider inner diameter for a purpose to be described below. In the interior of the cylinder, a plunger (not shown) is located thereby dividing the cylinder into two sections, wherein one section is connected to a pressure medium while the other section contains a pressure cushion of a compressed gas and is connected to a gas pressure generator (not shown).

Each lid for sealing of the respective end face includes a cover plate 2 and a cover member 3. The cover plate 2 has a T-shaped cross section and thus defines a recess 2*a* at its peripheral area. The cover member 3 is integrally provided with a projection extending inwardly into the interior of the cylinder and is inserted into the recess 2*a* for engagement with the cover plate 2. The width of the recess 2*a* in an axial direction is, however, greater than the width of the cover member 3 so that an annular groove-shaped clearance 5*c* is defined between the cover plate 2 and the cover member 3. In this clearance 5*c*, a sealing member 5 is located and formed as a relatively thick ring-shaped disk which is made of an elastic material. The thus-formed sealing member has large radial contact surfaces with the cover plate and cover member.

As illustrated in the FIGURE, the cover member 3 is further provided with a flange portion 3*b* which extends into an annular depression 1*b* provided in the end section 1*a* of the cylinder 1. Abutting the cover member 3 is a threaded ring 4 coaxially disposed to the axis of the cylinder and screwed in the end section 1*a* of the cylinder 1 for fixing the lid within the cylinder 1. According to a first embodiment, the threaded ring 4 can be provided with an external thread which is in engagement with an internal thread provided in the end section 1 of the cylinder. According to a second embodiment, the threaded ring 4 may, however, be formed as a screw cap which engages an external thread within the end secion 1*a*.

As can be seen from the FIGURE, the cover plate 2 is provided with an outer edge abutting the cylinder wall 1*d* which edge is of an outwardly tapered shape to form a first groove 7*a*. Likewise, the cover member 3 has an edge facing the cylinder wall 1*d* of an outwardly tapered shape to form a second groove 6*a*. The clearance 5*c* is thus wedge-shaped and widens towards the cylinder wall 1*d*. The sealing member 5 which as previously mentioned is located in the clearance 5*c* is provided at its outer edges facing the cylinder wall 1*d* with a first and second recess 5*b*, 5*d*, respectively. A third recess 5*a* is arranged at the inner edge facing the cover member and the cover plate. The three recesses 5*a*, 5*b*, 5*d* are of a square cross section, wherein the recesses 5*b*, 5*d* have a depth which corresponds to the depth of the first groove 7*a* at the outer edge of the cover plate as well as to the depth of the second groove 6*a* at the outer edge of the cover member 3.

In these spaces defined by the first groove 7*a* and first recess 5*b*, by the second groove 6*a* and second recess 5*d*, and by the third recess 5*a*, support rings 7, 6, 8 are arranged respectively. The support rings 6, 7, 8 are each of a still deformable material; however, in comparison with the material used for the sealing member 5 the support rings are of a material which is essentially firmer. As suitable material, polyacethale resin, polyamide penetrated with glass particles, copper or any other suitable metal may be used for producing the support rings. The sealing member 5 is preferably made of a synthetic rubber, like PEBUNAN. In order to avoid any gaps between the lid parts and the cylinder wall, the cross section of the support rings 6, 7, 8 corresponds to the cross section of the respective annular spaces 7*a*, 5*b*; 6*a*, 5*d*; 5*a*.

The cover plate 2 is additionally provided with a further annular groove 9 of rectangular shape at its inner rim facing the end section 1*a* of the cylinder wall 1*d*. In this annular groove 9, a locking ring 10 is provided which has a width smaller than the width of the annular groove 9. The locking ring abuts the cover ring 3 to lock the latter.

It will be understood that each of the elements described above, or two or more together, may also find a useful application in other types of pressure accumulators differing from tye types described above.

While the invention has been illustrated and described as embodied in a pressure accumulator, it is not intended to be limited to the details shown, since various modifications and structural changes may be made without departing in any way from the spirit of the present invention.

Without further analysis, the foregoing will so fully reveal the gist of the present invention that others, can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

I claim:

1. A vessel of a pressure accumulator, especially for hydraulic systems in a control mechanism of electric high-voltage lines, comprising, a cylinder closable at its end faces and having a cylinder wall, the cylinder having an interior and a predetermined inner diameter; a lid for sealing off each end face of the cylinder, the lid including a cover plate which is inserted in tye cylinder and of such a shape that an annular recess is defined at its periphery, a cover member located in the annular recess and concentrically surrounding a part of the cover plate, thereby defining a first annular groove between the cover plate and the cover member, and a sealing member disposed in the annular recess between the cover plate and the cover member and formed as a ring-shaped disk, the cover plate having at its peripheral area a first edge whereas the cover member has at its peripheral area a second edge facing each other and being tapered outwardly so as to form a first and second tapered groove of a predetermined depth so that the annular recess between the cover plate and the cover member widens towards the cylinder wall, the sealing member being formed as an annular disc of elastic material provided at its radially outer edge facing the cover plate with a first recess, at its radially outer edge facing the cover member with a second recess, with both said first and second recesses having a depth corresponding to the depth of the first and second tapered grooves, and its radially inner edge with a third recess; and supporting means for supporting said sealing member and including a first support ring provided within the first recess and the first tapered groove, a second support ring provided within the second recess and the second tapered groove, and a third support ring provided within the third recess, each support ring being of a deformable material ewsentially firmer than the material of the sealing member, each support ring having a cross-section corresponding to the cross-section of the respective spaces defined by the first recess and first tapered groove, second recess and second tapered groove and by the third recess, respectively.

2. A pressure accumulator as defined in claim 1, wherein the cylinder wall is provided with an end section having an inner diameter larger than the inner diameter of the remaining portion of the cylinder wall and thereby forming an annular depression.

3. A vessel of a pressure accumulator as defined in claim 2, wherein the cover member includes a radially projecting flange engaging in the annular depression.

4. A vessel of a pressure accumulator as defined in claim 2; further comprising a threaded ring having an external thread, the end section of the cylinder wall being provided with an internal thread for receiving the threaded ring so as to lock the end face of the cylinder.

5. A vessel of a pressure accumulator as defined in claim 2, further comprising a threaded ring formed as a screw cap, the end section of the cylinder wall being provided with external thread which is screwable with the threaded ring.

6. Pressure accumulator as defined in claim 1, wherein the cover plate is further provided with a ring-shaped groove at its periphery close to the end face; and further comprising a locking ring disposable in the ring-shaped groove and engaging the cover member.

7. Pressure accumulator as defined in claim 6, wherein the ring-shaped groove is wider than the locking ring inserted therein.

8. Pressure accumulator as defined in claim 1, wherein the sealing member is of synthetic rubber.

9. Pressure accumulator as defined in claim 1, wherein each support ring is of synthetic material.

10. Pressure accumulator as defined in claim 9, wherein each support ring is of polyacethale resin.

11. Pressure accumulator as defined in claim 9, wherein each support ring is of polyamide penetrated by glass particles.

12. Pressure accumulator as defined in claim 1, wherein each support ring is of metal.

13. Pressure accumulator as defined in claim 12, wherein each support ring is of copper.

14. A vessel of a pressure accumulator especially for hydraulic systems in a control mechanism of electric high-voltage lines, comprising a cylinder closable at its end faces and having a cylinder wall, the cylinder having an interior and a predetermined inner diameter; and a lid for sealing off each end face of the cylinder, the lid including a cover plate which is inserted in the cylinder and of such a shape that an annular recess is defined at its periphery, a cover member located in the annular recess and concentrically surrounding a part of the cover plate, thereby defining a first annular groove between the cover plate and the cover member, and a sealing member disposed in the annular groove between the cover plate and the cover member and formed as a ring-shaped disk, wherein the cylinder wall is provided with an end section of an inner diameter larger than the inner diameter of the remaining portion of the cylinder wall, the end section being provided with an annular depression, the cover member including an annular plate which is in engagement with the cover plate and a flange radially projecting from the annular plate and engaging in the annular depression, wherein the cover plate is provided with a first edge at its peripheral area and the cover member is provided with a second edge, at its peripheral area, the first and the second edges facing each other and being tapered outwardly so as to form a first and second tapered groove of a predetermined depth so that the annular groove between the cover plate and the cover member widens towards the cylinder wall, the sealing member being provided with a first recess at its radially outer edge facing the cover plate and with a second recess at its radially outer edge facing the cover member, the first and the second recesses both having a depth corresponding to the depth of the first and second tapered grooves, and with a third recess at its inner edge, each of the first, second and third recesses being of a square cross-section wherein a first support ring is provided within the first recess and the first tapered groove, a second support ring is provided within the second recess and the second tapered groove, and a third support ring is provided within the third recess, each support ring being of a material essentially firmer than the material of the sealing member and having a cross-section corresponding to the cross-section of the respective spaces defined by the first recess and first tapered groove, second recess and second tapered groove and by the third recess.

* * * * *